us008298645B2

(12) United States Patent
Rock et al.

(10) Patent No.: US 8,298,645 B2
(45) Date of Patent: *Oct. 30, 2012

(54) MULTI-LAYER FLAME RETARDANT FABRIC

(75) Inventors: Moshe Rock, Brookline, MA (US); Jane Hunter, Manassas, VA (US); David Costello, Marblehead, MA (US); Gadalia Vainer, Melrose, MA (US)

(73) Assignee: MMI-IPCO, LLC., Lawrence, MA (US)

( * ) Notice: Subject to any disclaimer, the term of this patent is extended or adjusted under 35 U.S.C. 154(b) by 1172 days.

This patent is subject to a terminal disclaimer.

(21) Appl. No.: 11/757,031

(22) Filed: Jun. 1, 2007

(65) Prior Publication Data

US 2007/0234463 A1 Oct. 11, 2007
US 2009/0089912 A9 Apr. 9, 2009

Related U.S. Application Data

(60) Division of application No. 11/001,893, filed on Dec. 1, 2004, now Pat. No. 7,776,421, which is a continuation-in-part of application No. 10/047,939, filed on Oct. 23, 2001, now Pat. No. 6,927,182.

(51) Int. Cl.
*B32B 3/02* (2006.01)
*B32B 27/12* (2006.01)
*B32B 33/00* (2006.01)
*D03D 15/08* (2006.01)

(52) U.S. Cl. .............. 428/88; 428/86; 428/96; 442/182; 442/184; 442/286; 442/312; 442/314

(58) Field of Classification Search ............... 428/86, 428/91, 95; 442/182–184, 277, 286, 312, 442/315

See application file for complete search history.

(56) References Cited

U.S. PATENT DOCUMENTS 2,144,514 A 1/1939 Speh et al. ............... 2/94
(Continued)

FOREIGN PATENT DOCUMENTS

EP 0313261 4/1989
(Continued)

OTHER PUBLICATIONS

Communication issued by the European Patent Office EP Application No. 04 255 593.8-2314 dated Sep. 20, 2007, 4 pages.
(Continued)

*Primary Examiner* — Jenna Johnson
(74) *Attorney, Agent, or Firm* — Fish & Richardson P.C.

(57) ABSTRACT

A composite velour fabric garment includes a laminate consisting of an outer woven shell layer, an inner thermal layer of knit construction, and an intermediate layer disposed between and laminated to each of the shell layer and the thermal layer. The outer woven shell layer contains spandex in at least a weft direction for stretch and recovery in a width direction. The knit construction of the inner thermal layer provides stretch in at least a width direction, in harmony with the shell layer, and the inner thermal layer has a raised surface facing inwardly, away from the shell layer. The raised surface includes a plurality of discrete pillar regions of sinker loop yarn arranged in a grid or box pattern and configured to form a plurality of intersecting channels between a wearer's body and the inner thermal layer. The intermediate layer has controlled air permeability, including zero air permeability. One or more of the outer, inner, and intermediate layers include flame retardant material.

37 Claims, 2 Drawing Sheets

U.S. PATENT DOCUMENTS

| | | | |
|---|---|---|---|
| 3,695,967 A | 10/1972 | Ross | |
| 3,837,943 A | 9/1974 | Ploch et al. | 156/93 |
| 4,067,209 A | 1/1978 | Kucera et al. | |
| 4,103,518 A | 8/1978 | Lombardi et al. | 66/107 |
| 4,872,220 A | 10/1989 | Haruvy et al. | |
| 5,001,781 A | 3/1991 | Grilliot et al. | |
| 5,364,678 A | 11/1994 | Lumb et al. | |
| 5,415,924 A | 5/1995 | Herlihy, Jr. | |
| 5,691,040 A | 11/1997 | Barbeau et al. | |
| 5,727,401 A | 3/1998 | Statham | |
| 5,906,876 A | 5/1999 | Conway | |
| 5,981,020 A * | 11/1999 | Sutherland et al. | 428/85 |
| 6,018,819 A * | 2/2000 | King et al. | 2/69 |
| 6,192,520 B1 | 2/2001 | Underwood et al. | |
| 6,490,734 B2 | 12/2002 | Blauer et al. | 2/87 |
| 6,782,590 B2 | 8/2004 | Rock et al. | |
| 6,794,008 B2 | 9/2004 | Wildeman | |
| 2002/0059674 A1 | 5/2002 | Blauer et al. | 2/87 |
| 2003/0077967 A1 | 4/2003 | Rock et al. | 442/312 |
| 2003/0104735 A1 | 6/2003 | Rock | |
| 2004/0132367 A1 | 7/2004 | Rock | |
| 2005/0075028 A1 | 4/2005 | Rock et al. | |

FOREIGN PATENT DOCUMENTS

| | | |
|---|---|---|
| EP | 0445394 | 9/1991 |
| EP | 0541206 | 5/1993 |
| EP | 1 067 226 | 1/2001 |
| WO | WO 0112889 A1 | 2/2001 |

OTHER PUBLICATIONS

European Search Report; EP 05 25 7418; Mar. 22, 2006; S. Girard, The Hague.

Canadian Intellectual Property Office Office Action in Canadian Application No. 2,408,687, mailed Sep. 21, 2009, 3 pages.

The European Search Report dated Apr. 27, 2012 (10 pages).

\* cited by examiner

MULTI-LAYER FLAME RETARDANT FABRIC

CROSS-REFERENCE TO RELATED APPLICATIONS

This application is a division of U.S. application Ser. No. 11/001,893, filed Dec. 1, 2004, now U.S. Pat. No. 7,776,421, issued Aug. 17, 2010, which is a continuation-in-part of U.S. application Ser. No. 10/047,939, filed Oct. 23, 2001, now U.S. Pat. No. 6,927,182, issued Aug. 9, 2005. The entire disclosure of U.S. application Ser. No. 11/001,893 is incorporated herein by reference.

TECHNICAL FIELD

This invention relates to multi-layer composite fabrics.

BACKGROUND

Multi-layer composite fabrics are achieved by joining together one or more layers and materials in a fabric body for the purpose of attaining desirable combinations of properties that cannot be provided by any of the materials or layers along. Laminated multi-layer composites (e.g., those having multiple layers joined, e.g., by adhesive) are frequently formed by enhance thermal resistance performance. Other properties can also be enhanced through multi-layer composite fabrics.

SUMMARY

According to the invention, a composite velour fabric garment including a laminate comprises: an outer woven shell layer comprising spandex in at least a weft direction for stretch and recovery in a width direction; an inner thermal layer of knit construction for stretch in at least a width direction, in harmony with the shell layer, with a raised surface facing inwardly, away from the shell layer, the raised surface including a plurality of discrete pillar regions of sinker loop yarn arranged in a grid or box pattern and configured to form a plurality of intersections channels between a wearer's body and the inner thermal layer; and an intermediate layer having controlled air permeability (including zero air permeability), the intermediate layer being disposed between and laminated to each of the shell layer and the thermal layer. One or more of the outer, inner, and intermediate layers comprise flame retardant material.

Preferred embodiments of the invention may include on or more of the following additional features. The shell layer comprises spandex in warp direction and in weft direction for stretch and recovery in both length direction and width direction, and the inner thermal layer of knit construction has stretch in both length direction and in width direction, in harmony with the shell layer. The spandex of the outer shell layer comprises one or more forms of spandex selected from the group consisting of: bare spandex filaments, covered spandex, and air tuck spandex. The garment has good stretch and recovery. The garment has good flame retardant properties. Preferably, the garment has high insulation to thermal and radiant heat. The outer shell layer comprises flame retardant material having an L.O.I. greater than about 28. Preferably the outer shell layer comprises flame retardant fibers, e.g. formed of one or more materials selected from the group consisting of: aramides, melamines, FR polyesters, inherent flame retardant materials, and blends thereof. The inner thermal layer comprises flame retardant material having an L.O.I. greater than about 28. The inner thermal layer comprises loop yarns and stitch yarns comprising flame retardant materials having an L.O.I. greater than about 28. Preferably, the loop yarns and the stitch yarns comprising flame retardant material serve to enhance heat and fire protection of the garment against radiant heat and flame. The inner thermal layer defines a multiplicity of predetermined discrete regions of contrasting insulative capacity positioned about the garment surface, by application of body mapping principals in an arrangement having correlation to insulative requirements of corresponding regions of a wearer's body. Preferably, the multiplicity of discrete regions of contrasting insulative capacity positioned about the garment comprise one or more selected regions of relatively lower insulation performance and relatively enhanced permeability created through engineering knitting technology, where the selected regions have no loop or low loop relative to surrounding regions of relatively higher loop and relatively higher insulation performance, or, alternatively, the multiplicity of discrete regions of contrasting insulative capacity positioned about the garment comprise one or more selected regions of relatively lower insulation performance and relatively enhanced permeability created through engineering printing technology, where the selected regions have a coating of binder material causing the selected regions to resist raising relative to surrounding relatively raised regions of relatively higher insulation performance. The intermediate layer having predetermined air permeability is selected from the group consisting of: foamed adhesive in a discontinuous film, adhesive in a continuous film mechanically altered by a process of crushing and stretching, breathable adhesive in a discontinuous film, and a membrane mechanically altered by a process of stretching and perforation. The breathable adhesive comprises a flame retardant polymer. Preferably, the flame retardant polymer comprises a polymeric material having an L.O.I. at or above about 28. The flame retardant polymer comprises one or more flame retarding additives. The intermediate layer has controlled air permeability in the range of about 0 CFM to about 100 CFM, and preferably in the range of about 3 CFM to about 10 CFM. The intermediate layer having predetermined air permeability has zero air permeability. The intermediate layer comprises a full film breathable membrane. Preferably, the full film breathable membrane of the intermediate layer is formed of a material selected from the group consisting of: polyurethane, polyetherester, EPTFE (stretchable poly tetra fluoro ethylene), and SPM (selective permeable membrane). One or more regions of an outer surface of the outer shell layer has a continuous or a noncontinuous coating comprising an abrading resistant material. One or more regions of an outer surface of the outer shell layer has a continuous or a noncontinuous coating comprising a pilling resistant material. One or more regions of an outer surface of the outer shell layer has a continuous or a noncontinuous coating comprising a water-repelling material. The outer shell layer is formed of a material having anti-static properties. One or more regions of the garment has good hydrostatic resistance. One or more regions of the garment has high moisture vapor transmission in static conditions and in dynamic conditions. One or more regions of the outer surface of the outer shell layer has a non-continuous or continuous coating comprising discrete coating segments of coating material applied to bind individual yarn fibers together for enhanced abrasion resistance performance. The discrete coating segments of coating materials comprise discrete dots. One or more regions of an outer surface region of the outer shell layer has a non-continuous coating of binder material adhered at least at interlacing intersections for enhanced durability performance against pilling or fraying.

Adhering binder material is limited in a manner to substantially avoid restriction of air permeability through the composite velour fabric garment.

The entire disclosures of U.S. application Ser. Nos. 09/982,720; 09/883,643; 09/347,825; 10/650,098; 09/378,344; 60/098,254; 09/863,852; and 10/341,309, are incorporated herein by reference.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
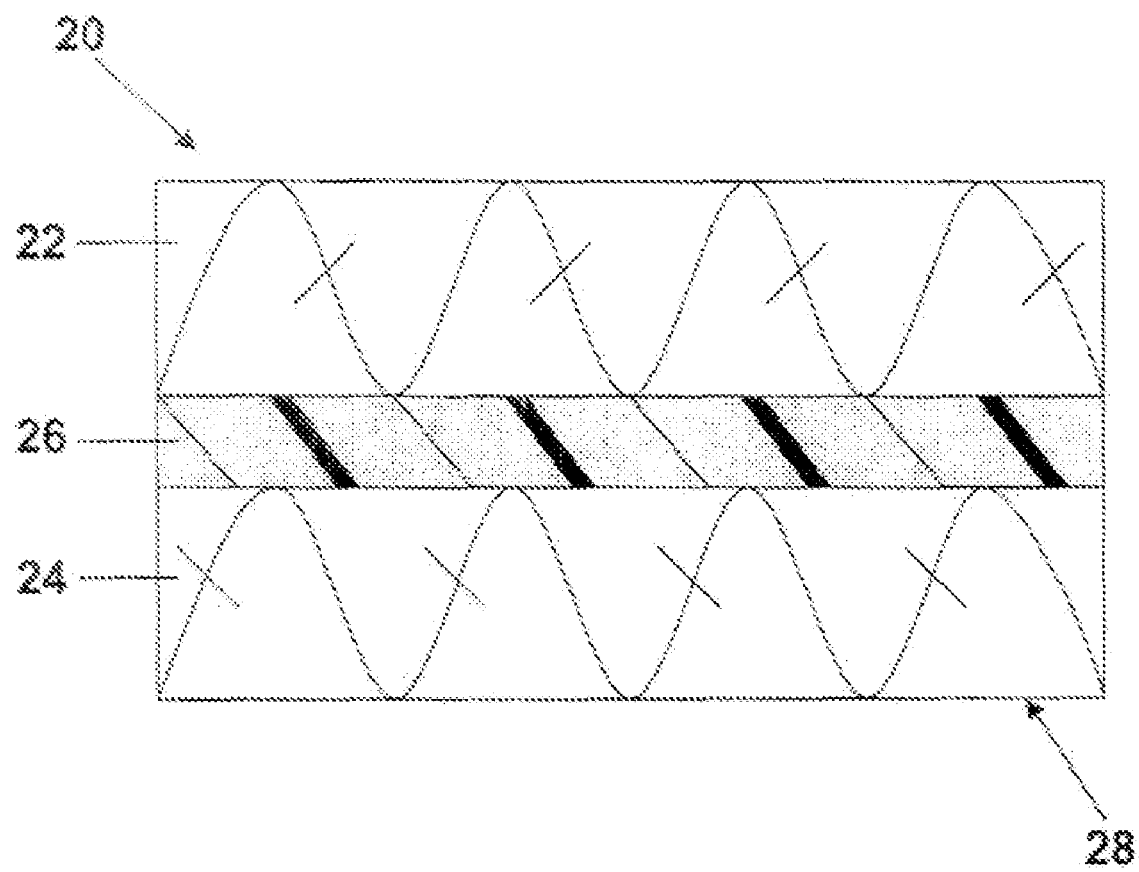
FIG. 1 is a cross-sectional view of a multi-layer composite fabric of the invention.

Referring to FIG. 1, a multi-layer composite fabric laminate 20 of the invention provides flame retardance and improved dynamic insulation performance in a velour fabric article. The composite fabric laminate 20 consists of an outer shell 22 formed, e.g., of woven fabric, and an inner thermal layer 24 formed, e.g., of knit construction, both being laminated to an intermediate, air-permeable or air impermeable barrier layer 26 disposed therebetween. The barrier layer is formed, e.g., of a discontinuous or continuous member or layer of adhesive to permit controlled air permeability (including zero air permeability). The components of the composite fabric laminate are formed of flame retardant materials and/or additives to provide flame retardant properties. In fact, the laminate is preferably almost self-extinguishing. In addition, the composite fabric laminate 20 has the properties of high moisture vapor transmission in static and dynamic conditions, good stretch and recovery, good hydrostatic resistance, e.g. as determined in accordance with ASTM D-751, i.e. by pressure application by a rising column of water, the complete disclosure of which test method is incorporated herein by reference, and high insulation to thermal and radiant heat.

Woven Outer Shell (22)

In preferred embodiments, the woven outer shell 22 contains spandex in the warp and weft directions, for two-way stretch, i.e. in the length and width directions. Alternatively, the shell may contain spandex only in the weft direction, for one-way stretch, i.e. mainly in the width direction. The spandex contained by the stretchable woven fabric shell may be in the form of bare spandex filaments, covered spandex, air tuck spandex, or as otherwise suited to the fabric construction. The woven fabric shell is thus provided with characteristics of good stretch and recovery. It may also have the characteristics of high abrasion resistance, e.g. as determined in accordance with ASTM D-3884; high pilling resistance, e.g. as determined in accordance with ASTM D-3512; very good water repellence, e.g. as determined in accordance with AATCC 22-1980; and good antistatic properties. The complete disclosures of all of these test methods are enclosed herein by reference. Methods and procedures for achieving desired levels of abrasion resistance and pilling resistance according to the invention are described, e.g., in U.S. patent application Ser. No. 10/700,405, filed Nov. 4, 2003; U.S. Provisional Patent Application No. 60/493,275, filed Aug. 7, 2003; and U.S. patent application Ser. No. 10/911,855, Aug. 5, 2004, the complete disclosures of all of which are incorporated herein by reference.

The woven fabric shell 22 may also be formed of, and/or incorporate, fibers of flame retardant materials, such as aramides, e.g. as sold under the trademark NOMEX® by E.I. du Pont de Nemours and Co., Inc., of Wilmington, Del., or blends of fibers, such as NOMEX® (aramide fibers), KEVLAR® (para-aramide fibers, also available from E.I. du Pont), and anti-static fibers. As used herein, the term flame-retardant refers to fabrics and other materials that, due to chemical treatment or inherent properties, do not ignite readily or propagate flaming under small-to-moderate fire exposure. See, e.g., Fire Protection Handbook ($17^{th}$ Edition), National Fire Protection Association, Quincy, Mass., 1992, (p. 3-174), the complete disclosure of which is incorporated herein by reference.

Inner Thermal Fabric Layer (24)

The inner thermal layer 24 is formed of a knit construction with an inner surface 28 facing the wearer's body. The sinker loop yarns of the inner surface may be raised and finished, e.g. in velour or shearling, or as terry loop. The knit construction of the inner thermal layer provides two-way stretch, i.e. in the length and width directions or, alternatively, it may only provide for one-way stretch, i.e. mainly in the width direction. In either case, the stretch and recovery of the inner thermal layer 24 and the outer shell 22 are in harmony, i.e., by design, a two-way stretch outer shell will be laminated with a two-way stretch inner thermal layer and a one-way stretch outer shell will be laminated with a one-way stretch inner thermal layer.

The inner thermal fabric layer 24 may also be formed of, and/or incorporate, fibers of flame retardant materials, such as aramides, e.g. as sold under the trademark NOMEX® by E.I. du Point de Nemours and Co., Inc., of Wilmington, Del. or under the trademark PBI® by Celanese Advanced Materials, Inc. of Charlotte, N.C.; melamine e.g. as sold under the trademark BASOFIL® by Basofil Fibers, LLC of Charlotte, N.C.; FR ("flame retardante") polyester, or other suitable materials. The pile height of the raised fibers of inner surface 28 determines the insulation properties of the composite laminate fabric 20, and, in the case of flame retardant material being incorporated in the loop yarn and stitch yarn, the height will also determine the level of radiant heat and fire protection provided against radiant heat and flame.

Figure 2:
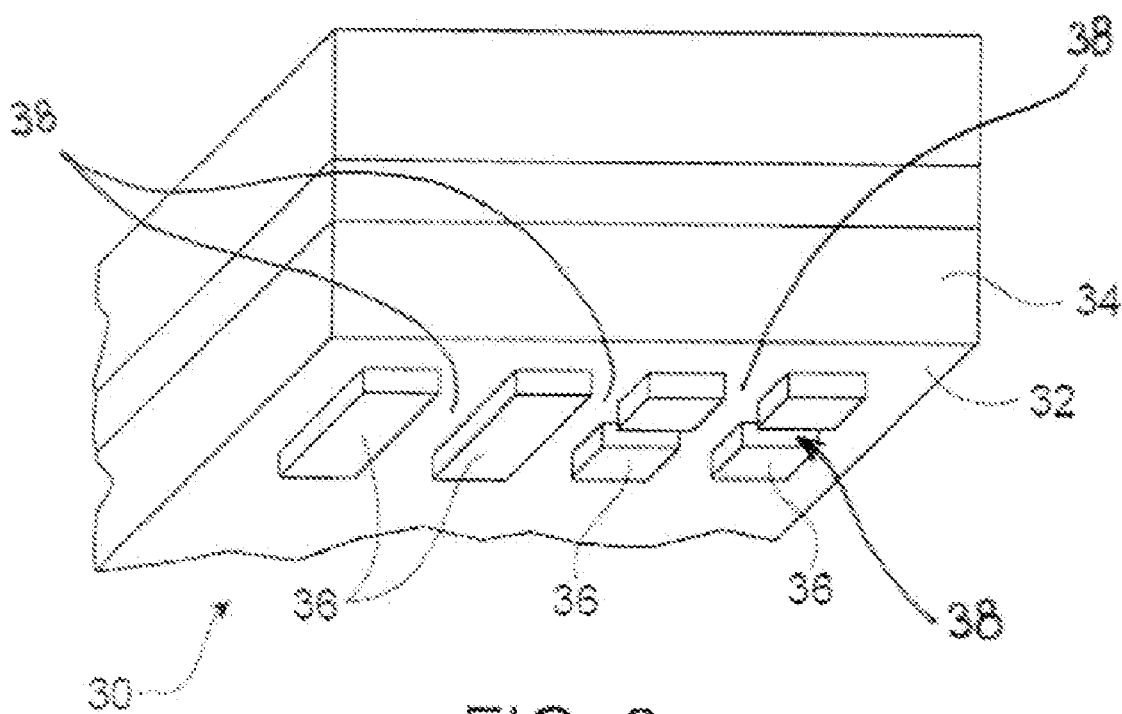
FIG. 2 is a perspective view of another embodiment of a multi-layer composite fabric of the invention having a pattern of raised surface regions formed on the inner surface of the inner thermal fabric layer.

Referring to FIG. 2, in another embodiment of a multi-layer composite fabric laminate 30, the sinker loop construction of inner surface 30 or the inner thermal fabric layer 32 may have the form of a pattern, such as grid, box, etc., selected to generate a channeling effect, e.g. as described in U.S. application Ser. No. 10/047,939, filed Oct. 23, 2001, the complete disclosure of which is incorporated herein by reference. For example, the inner thermal fabric layer 32 can include a plurality of vertical and horizontal channels 38 between fiber pillars 36 (i.e., discrete pillar regions of sinker loop yarn) as illustrated in FIG. 2. The plurality of channels formed along the inner fabric layer facilitates maintaining a cushion of air along the skin for added warmth during static physical conditions and enhanced air flow during physical activity, thereby creating a heat dissipating or cooling effect. The resulting fabric has relatively reduced weight but still maintains a relatively high level of thermal and radiant heat insulation.

Figure 3:
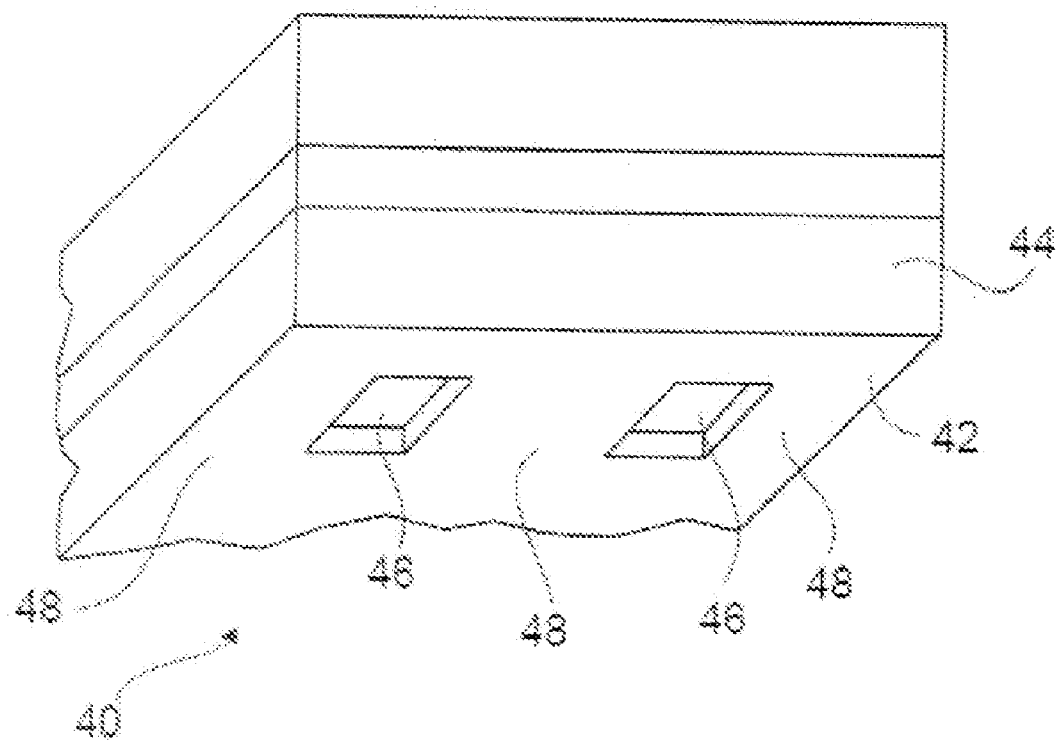
FIG. 3 is a perspective view of another embodiment of a multi-layer composite fabric of the invention having regions of no loop or low loop, or otherwise unraised surface, disposed selectively about a raised surface formed on the inner surface of the inner thermal fabric layer.

Referring to FIG. 3, in still another embodiment of a multi-layer composite fabric laminate 40, the inner surface 42 of the inner thermal fabric layer 44 may have regions 46 of low loop or no loop, or otherwise remaining unraised, disposed among relatively raised regions 48. The arrangement of the respective regions 46, 48 is determined according to principles of body mapping, with the regions 46 of low loop or no loop being positioned to generally overlie surfaces of the wearer's body requiring relatively low insulation and relatively high air permeability, e.g. in the wear's armpit area, and raised regions 48 of surface 42 being positioned to generally overlie surfaces of the wearer's body requiring relatively more insulation and relatively less permeability. These body mapping arrangements may be achieved, e.g., through engineering knitting, where selected regions 46 or low loop or no loop are formed (as described, e.g., in U.S. Provisional Application No. 60/582,674, filed Jun. 24, 2004; in U.S. Provisional Application No. 60/605,563, filed Aug. 30, 2004; and in U.S. Provisional Application No. 60/626,191, filed Nov. 9, 2004, the complete disclosures of all of which are incorporated herein by reference). Alternatively, the mapping arrangements may be achieved, e.g., through engineering printing technology, where selected regions 46 requiring relatively less insulation and more permeability are coated with a binder material to cause the regions to resist raising (as described in U.S. Provisional Application No. 60/493,275, filed Aug. 7, 2003, in U.S. application Ser. No. 10/911,855, filed Aug. 5, 2004, and in U.S. Provisional Application No. 60/626,027, filed Nov. 8, 2004, the complete disclosures of all of which are incorporated herein by reference).

Intermediate Breathable Barrier Layer (26)

The intermediate barrier layer 26 importantly provides controlled air permeability (including zero permeability), e.g. in the range of about 0 CFM to about 100 CFM, and preferably in the range of about 3 CFM to about 10 CFM, as determined in accordance with ASTM D-737, the complete disclosure of which is incorporated herein by reference. The controlled air permeability of the breathable film serves to enhance the comfort level afforded to the wearer in dynamic conditions, where permeation by ambient air cools down the wearer by reducing the level of moisture vapor in the micro climate between the outer shell fabric 22 and the wearer's skin, and enhances the cooling down effect by increasing the heat of evaporation and convection heat loss.

The breathable intermediate barrier may have the form of non-continuous, breathable film, or it may have the form of a non-continuous adhesive layer formed without a film, or it may have the form of an adhesive layer formed as a full layer, without a film, which is subsequently crushed to create a non-continuous layer. Methods and materials for forming a typical breathable intermediate barrier suitable for use in a composite fabric laminate 20 of the invention are described, e.g., in U.S. patent application Ser. No. 10/650,098, filed Aug. 25, 2003, the complete disclosure of which is incorporated herein by reference. The intermediate barrier, whether non-continuous film or adhesive, may also have flame retardant properties provided by selection of flame retardant polymeric materials having a Limiting Oxygen Index ("L.O.I.") over 28, and/or by selection of flame retardant additives.

In other embodiments, e.g. where the fabric intended for use, e.g., by firefighters or helicopter crews performing emergency rescues above or in bodies of water, the intermediate barrier may be formed of a full film breathable membrane formed of a material such as polyurethane, polyetherester, EPTFE (stretchable poly tetra fluoro ethylene), SPM (selective permeable membrane), etc. In such cases, the intermediate barrier may be impermeable, with controlled air permeability of 0 CFM in both static and dynamic conditions.

A number of embodiments of the invention have been described. Nevertheless, it will be understood that various modifications may be made without departing from the spirit and scope of the invention.

What is claimed is:

1. A composite velour fabric garment including a laminate comprising:

an outer shell layer, the outer shell layer comprising spandex in a warp direction and in a weft direction for stretch and recovery in both a length direction and a width direction;

an inner thermal layer of knit construction, with an inner surface facing inwardly, away from the outer shell layer, between a body of a wearer and the inner thermal layer, and with an opposite outer surface, the inner surface defining discrete pillar regions of relatively deeper pile, said discrete pillar regions of relatively deeper pile being spaced apart and isolated from each other by regions of relatively shorter pile or no pile that form a plurality of intersecting channels passing among said discrete pillar regions and open to skin of the wearer, said plurality of intersecting channels defining insulation regions to contain a cushion of air for promoting warmth under static conditions during periods of wearer inactivity and defining circulation regions creating avenues for flow of air and enhanced evaporation of moisture from the skin of the wearer for creating a heat dissipation or cooling effect during periods of physical activity by the wearer, and the inner thermal layer of knit construction having stretch in both the length direction and the width direction, in harmony with the outer shell layer; and an intermediate layer having controlled air permeability, said intermediate layer being disposed between and laminated to at least one of the outer shell layer and the inner thermal layer; and wherein the garment has good flame retardant properties, with one or more of the outer shell layer, the inner thermal layer, and the intermediate layer comprising a flame retardant material, and the garment has good stretch and recovery.

2. The composite velour fabric garment of claim 1, wherein the spandex of the outer shell layer comprises one or more forms of spandex selected from the group consisting of: bare spandex filaments, covered spandex, and air tuck spandex.

3. The composite velour fabric garment of claim 1, wherein the garment has high insulation to thermal and radiant heat.

4. The composite velour fabric garment of claim 1, wherein the outer shell layer comprises the flame retardant material and the flame retardant material has an L.O.I. greater than about 21.

5. The composite velour fabric garment of claim 4, wherein at least the outer shell layer comprises flame retardant fibers.

6. The composite velour fabric garment of claim 5, wherein the flame retardant fibers are formed of one or more materials selected from the group consisting of: aramides, melamines, FR polyesters, inherent flame retardant materials, and blends thereof.

7. The composite velour fabric garment of claim 1, wherein at least the inner thermal layer comprises the flame retardant material and the flame retardant material has an L.O.I. greater than about 21.

8. The composite velour fabric garment of claim 7, wherein the inner thermal layer comprises loop yarns and stitch yarns and the loop yarns and the stitch yarns comprise the flame retardant material having an L.O.I. greater than about 21.

9. The composite velour fabric garment of claim 8, wherein the loop yarns and the stitch yarns comprising the flame retardant material serve to enhance heat and fire protection of the garment against radiant heat and flame.

10. The composite velour fabric garment of claim 1, wherein the intermediate layer having controlled air permeability is selected from the group consisting of: foamed adhesive in a discontinuous film, adhesive in a continuous film mechanically altered, breathable adhesive in a discontinuous film, and a membrane mechanically altered.

11. The composite velour fabric garment of claim 10, wherein the breathable adhesive comprises a flame retardant polymer.

12. The composite velour fabric garment of claim 11, wherein the flame retardant polymer comprises a polymeric material having an L.O.I. at or above about 21.

13. The composite velour fabric garment of claim 11 or claim 12, wherein the flame retardant polymer comprises one or more flame retarding additives.

14. The composite velour fabric garment of claim 1, wherein said intermediate layer having predetermined air permeability has zero air permeability.

15. The composite velour fabric garment of claim 14, wherein said intermediate layer comprises a full film breathable membrane.

16. The composite velour fabric garment of claim 15, wherein said full film breathable membrane of said intermediate layer is formed of a material selected from the group consisting of: polyurethane, polyetherester, EPTFE (stretchable poly tetra fluoro ethylene), and SPM (selective permeable membrane).

17. The composite velour fabric garment of claim 1, wherein one or more regions of an outer surface of the outer shell layer has a continuous or a noncontinuous coating comprising an abrading resistant material.

18. The composite velour fabric garment of claim 1, wherein one or more regions of an outer surface of the outer shell layer has a continuous or a noncontinuous coating comprising a pilling resistant material.

19. The composite velour fabric garment of claim 1, wherein one or more regions of an outer surface of the outer shell layer has a continuous or a noncontinuous coating comprising a water-repelling material.

20. The composite velour fabric garment of claim 1, wherein the outer shell layer is formed of a material having anti-static properties.

21. The composite velour fabric garment of claim 1, wherein one or more regions of the garment has good hydrostatic resistance.

22. The composite velour fabric garment of claim 1, wherein one or more regions of the garment has high moisture vapor transmission in static conditions and in dynamic conditions.

23. The composite velour fabric garment of claim 1, wherein one or more regions of an outer surface of the outer shell layer has a non-continuous or continuous coating comprising discrete coating segments of coating material applied to bind individual yarn fibers together for enhanced abrasion resistance performance.

24. The composite velour fabric garment of claim 23, wherein the discrete coating segments of coating materials comprise discrete dots.

25. The composite velour fabric garment of claim 1, wherein one or more regions of an outer surface region of the outer shell layer has a non-continuous coating of binder material adhered at least at interlacing intersections for enhanced durability performance against pilling or fraying.

26. The composite velour fabric garment of claim 25, wherein adhering the binder material is limited in a manner to substantially avoid restriction of air permeability through the composite velour fabric garment.

27. The composite velour fabric garment of claim 1, wherein the outer shell layer has a construction for stretch and recovery in at least the width direction, and the inner layer has a knit construction for stretch in at least the width direction, in harmony with the outer shell layer.

28. The composite velour fabric garment of claim 1, wherein the outer shell layer has a construction comprising spandex in at least the weft direction for stretch and recovery in at least the width direction.

29. The composite velour fabric garment of claim 1, wherein the outer shell layer has a knit construction for stretch and recovery in at least the width direction.

30. The composite velour fabric garment of claim 1, wherein the discrete pillar regions comprise terry sinker loop yarn arranged in a grid or box pattern and are configured to form the plurality of intersecting channels between the body of the wearer and the inner thermal layer.

31. The composite velour fabric article of claim 1, wherein said discrete pillar regions of said inner thermal layer have raised surfaces.

32. The composite velour fabric article of claim 1, wherein said outer surface of said inner thermal layer has a non-raised surface.

33. The composite velour fabric garment of claim 1, wherein said intermediate layer is disposed between and laminated to each of the outer shell layer and the inner thermal layer.

34. The composite velour fabric garment of claim 1 or claim 10, wherein the intermediate layer has controlled, non-zero air permeability in the range of greater than about 0 CFM to about 100 CFM.

35. The composite velour fabric garment of claim 34, wherein the intermediate layer has controlled air permeability in the range of about 3 CFM to about 10 CFM.

36. A composite velour fabric garment including a laminate comprising:
an outer shell layer, the outer shell layer comprising spandex for stretch and recovery in at least one direction;
an inner thermal layer of knit construction, with an inner surface facing inwardly, away from the outer shell layer, between a body of a wearer and the inner thermal layer, and with an opposite outer surface,
the inner surface defining discrete pillar regions of relatively deeper pile, said discrete pillar regions of relatively deeper pile being spaced apart and isolated from each other by regions of relatively shorter pile or no pile that form a plurality of intersecting channels passing among said discrete pillar regions and open to skin of the wearer, said plurality of intersecting channels defining insulation regions to contain a cushion of air for promoting warmth under static conditions during periods of wearer inactivity and defining circulation regions creating avenues for flow of air and enhanced evaporation of moisture from the skin of the wearer for creating a heat dissipation or cooling effect during periods of physical activity by the wearer, and
the inner thermal layer of knit construction having stretch in harmony with the outer shell layer; and an intermediate layer having controlled air permeability, said intermediate layer being disposed between and laminated to at least one of the outer shell layer and the inner thermal layer; and wherein the garment has good flame retardant properties, with one or more of the outer shell layer, the inner thermal layer, and the intermediate layer comprising a flame retardant material, and the garment has good stretch and recovery.

37. A composite velour fabric garment including a laminate comprising:

an outer shell layer;

an inner thermal layer of knit construction, with an inner surface facing inwardly, away from the outer shell layer, between a body of a wearer and the inner thermal layer, and with an opposite outer surface, the inner surface defining discrete pillar regions of relatively deeper pile, said discrete pillar regions of relatively deeper pile being spaced apart and isolated from each other by regions of relatively shorter pile or no pile that form a plurality of intersecting channels passing among said discrete pillar regions and open to the wearer's skin, said plurality of intersecting channels defining insulation regions to contain a cushion of air for promoting warmth under static conditions during periods of wearer inactivity and defining circulation regions creating avenues for flow of air and enhanced evaporation of moisture from the skin of the wearer for creating a heat dissipation or cooling effect during periods of physical activity by the wearer; and an intermediate layer having controlled air permeability, said intermediate layer being disposed between and laminated to at least one of the outer shell layer and the inner thermal layer; and wherein the garment has good flame retardant properties, with one or more of the outer shell layer, the inner thermal layer, and the intermediate layer comprising a flame retardant material.

\* \* \* \* \*